US012680289B2

(12) United States Patent
Nekkanti et al.

(10) Patent No.: US 12,680,289 B2
(45) Date of Patent: Jul. 14, 2026

(54) CEMENTITIOUS MATERIALS INCLUDING A LUMINESCENT COMPOUND FOR PRINTING 3-DIMENSIONAL STRUCTURES

(71) Applicant: SIKA TECHNOLOGY AG, Baar (CH)

(72) Inventors: Haripriya Nekkanti, Secaucus, NJ (US); Gary Boon, Fair Lawn, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 699 days.

(21) Appl. No.: 17/989,038

(22) Filed: Nov. 17, 2022

(65) Prior Publication Data

US 2024/0183145 A1 Jun. 6, 2024

(51) Int. Cl.

| | |
|---|---|
| ***E04B 1/16*** | (2006.01) |
| ***B28B 1/00*** | (2006.01) |
| ***B28B 11/00*** | (2006.01) |
| ***B28B 11/04*** | (2006.01) |
| ***B33Y 10/00*** | (2015.01) |
| ***B33Y 70/10*** | (2020.01) |
| ***B33Y 80/00*** | (2015.01) |
| ***C04B 7/32*** | (2006.01) |
| ***C04B 14/10*** | (2006.01) |
| ***C04B 28/06*** | (2006.01) |
| ***C04B 28/08*** | (2006.01) |
| *C04B 111/00* | (2006.01) |
| *C04B 111/80* | (2006.01) |

(52) U.S. Cl.

CPC ................ *E04B 1/16* (2013.01); *B28B 1/001* (2013.01); *B28B 11/001* (2013.01); *B28B 11/04* (2013.01); *B33Y 10/00* (2014.12); *B33Y 70/10* (2020.01); *B33Y 80/00* (2014.12); *C04B 7/323* (2013.01); *C04B 14/10* (2013.01); *C04B 28/065* (2013.01); *C04B 28/08* (2013.01); *C04B 2111/00181* (2013.01); *C04B 2111/807* (2013.01)

(58) Field of Classification Search

CPC ............ E04B 1/16; B33Y 10/00; B33Y 80/00

See application file for complete search history.

(56) References Cited

U.S. PATENT DOCUMENTS

| | | | |
|---|---|---|---|
| 2020/0130258 A1 | 4/2020 | Hengl et al. | |
| 2025/0002413 A1 * | 1/2025 | Yang | C04B 18/146 |

FOREIGN PATENT DOCUMENTS

| | | |
|---|---|---|
| CN | 109133771 A | 1/2019 |
| CN | 110065134 A | 7/2019 |
| EP | 3670470 A1 | 6/2020 |
| WO | 2020/187742 A1 | 9/2020 |
| WO | 2024/051078 A1 | 3/2024 |

* cited by examiner

*Primary Examiner* — Larry W Thrower

(74) *Attorney, Agent, or Firm* — Oliff PLC

(57) ABSTRACT

Systems and methods for printing a luminescent 3-dimensional object. The method includes mixing a dry cementitious composition with water, the dry cementitious composition comprising a cementitious binder, conveying the mixture to a print head, applying the mixture and one or more luminescent compounds from the print head to form a luminescent 3-dimensional object, and curing the luminescent 3-dimensional object.

12 Claims, 4 Drawing Sheets

CEMENTITIOUS MATERIALS INCLUDING A LUMINESCENT COMPOUND FOR PRINTING 3-DIMENSIONAL STRUCTURES

TECHNICAL FIELD

This application relates to additive manufacturing with cementitious materials that include a luminescent compound. It provides for methods and materials for the printing of 3-dimensional structures with excellent luminescence and printability and high compressive strength as well as their uses in security, safety, ornamentation, and decoration.

BACKGROUND

The printing of 3-dimensional objects with the use of cementitious materials as binders is known (see for example S. Lim et al "Developments in construction-scale additive manufacturing processes" in Automation in Construction, 2012, Vol 21, 262-268). Such techniques are also called additive manufacturing. Additive manufacturing allows for the manufacture of 3-dimensional objects in a variety of shapes.

In additive manufacturing with cementitious materials, pumpability, printability, buildability, and thixotropic behavior/rheology, are important properties. Quantitative measurements of these properties are known and as described in, e.g., Le, T. T., et al., "Mix design and fresh properties for high performance printing concrete", *Materials and Structures,* 45:1221-1232 (2012), which is hereby incorporated by reference. It has been therefore desirable to provide methods and materials to manufacture 3-dimensional objects with sufficient pumpability, printability, buildability, and thixotropic behavior/rheology by means of additive manufacturing.

At the same time, lighting of such 3-dimensional objects and areas outfitted with 3-dimensional objects, e.g., gardens, pools, courtyards, or other recreational areas, often benefit from lighting in the dark for safety, security, and decorative purposes. Conventionally, such areas may be outfitted with lighting infrastructure or systems to provide adequate lighting. Such systems require power sourcing which increases costs and complexity, and which may also have limited lifespan.

Despite the numerous solutions described in literature for high-strength cementitious materials, there is still a need to provide improved methods and materials for the 3-D printing of luminescent 3-dimensional objects with sufficient compressive strength and application properties, while exhibiting excellent luminescence properties. Since one way to achieve higher compressive strength of cementitious materials is to increase the packing density of fillers and aggregates used, investigation into the use of luminescent compounds in cementitious materials as substitutes for such aggregates has been discouraged.

SUMMARY

It is an objective of the disclosed embodiments to provide methods and cementitious materials for the printing of luminescent 3-dimensional objects to solve the above problems. It is a particular objective of the disclosed embodiments to provide methods and cementitious materials suitable to print luminescent 3-dimensional objects which, after curing, have good set time and acceptable flowability and compressive strength while exhibiting excellent luminescence. It is an additional objective of the disclosed embodiments to provide methods and materials suitable to print luminescent 3-dimensional objects with the use of cementitious materials as binders and where the heat release from the printed material is low. It is still another objective of the disclosed embodiments to provide for the use of cured luminescent cementitious 3-dimensional objects as ornaments or decorations.

In particular, the disclosed embodiments allow for the creation of luminescent 3-dimensional objects by additive manufacturing that:

(i) exhibit excellent set time (between 20 to 60 min) and flowability,
(ii) have a high compressive strength after curing for 1 day, 7 days, and 24 days, i.e., at least 15 MPa,
(iii) have a low carbon footprint,
(iv) have less need of finishing,
(v) are useful as ornaments or decorations, including sculptures, fountains, columns, pavers, garden structures, and the like,
(vi) have sufficient and long-lasting (e.g., 10 years or more) luminescent properties,
(vii) have excellent wear resistance due to homogenous mixing, and
(viii) have at least one of excellent pumpability, printability, buildability, and thixotropic behavior/rheology.

In embodiments, there is provided a method of printing a luminescent 3-dimensional object. The method comprises mixing a dry cementitious composition with water, the dry cementitious composition comprising a cementitious binder, conveying the mixture to a print head, applying the mixture and one or more luminescent compounds from the print head to form a luminescent 3-dimensional object, and curing the luminescent 3-dimensional object.

In embodiments, there is provided a dry cementitious composition. The composition comprises, relative to a total dry weight of the composition, 15 to 40 wt % of cement, 3 to 7 wt % of at least one of calcium aluminate cement and calcium sulfoaluminate cement, 0 to 35 wt % of at least one of slag and calcined clay, 4 to 12 wt % of one or more luminescent compounds, 5 to 60 wt % of at least one of aggregates and fillers, and 1 to 2 wt % of further additives.

In embodiments, there is provided a system for printing a luminescent 3-dimensional object. The system comprises a mixing device configured to mix a dry cementitious composition with water, the dry cementitious composition comprising a cementitious binder, and a conveyor configured to convey the mixture to a print head, the print head being configured to apply the mixture and one or more luminescent compounds from the print head to form a luminescent 3-dimensional object.

DETAILED DESCRIPTION

Definitions

Figure 1:
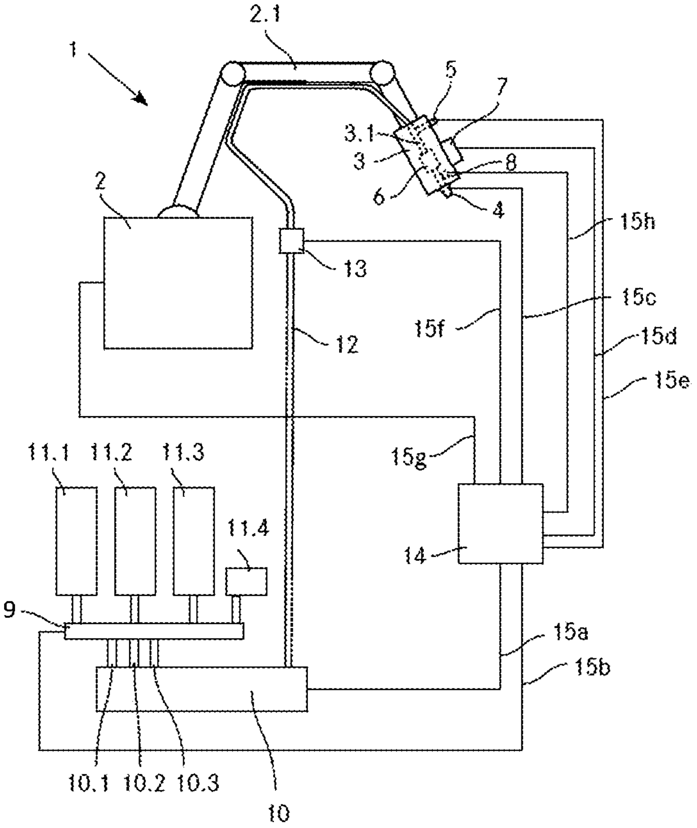
FIG. 1 is a schematic diagram of a system for producing a luminescent 3-dimensional object with an additive manufacturing process according to an embodiment.

As used herein, the terms “additive manufacturing” and “printing” have the same meaning and may be used interchangeably.

As used herein, a “dry cementitious composition” is a composition comprising at least one cement and essentially is free of water. Essentially free means that the water content is not more than 5 wt %, preferably not more than 1 wt %, relative to the total weight of the cementitious composition.

As used herein, the terms “luminescent” or “luminescence” describe a material that emits light upon excitation from a non-thermal source such as chemical reactions, electrical energy, electromagnetic rays, and mechanical stress, etc. There are different types of luminescence categorized by excitation source, e.g., bioluminescence originated from biochemical reactions in a living organism, mechanoluminescence generated by mechanical stress, and photoluminescence resulted from absorption of photons. Similar to fluorescence, phosphorescence is a form of photoluminescence involving relative slow emission of light by a substance that has absorbed light or other electromagnetic radiation. However, unlike fluorescence, where the substance would cease to glow almost immediately upon removal of the excitation source, phosphorescent materials would continue to glow and emit light for some time after the radiation source has been turned off. Hence, it is a persistent phenomenon compared to fluorescence. Phosphorescence is often the mechanism used for “glow-in-the-dark” (GiD) materials, which are charged by exposure to light. Unlike the relatively swift reactions in fluorescence such as those seen in a common fluorescent tube, GiD materials store the absorbed energy for a longer time at a metastable state. A phosphorescence lifetime is the average time needed for the stored energy to get released in a phosphorescent material.

As used herein, “ultra fine” refers to particle sizes of less than 0.1 μm.

As used herein, a “calcined clay” is a clay material that has been put to a heat treatment, preferably at a temperature between 500 to 900° C., or in a flash calcination process at temperatures between 800 to 1100° C. Calcined clay may be obtained from clay minerals of the kaolin group (such as kaolinite, dickite, nacrite or halloysite), the smectite group (such as montmorillonite, nontronite or saponite), the vermiculite group, serpentine, palygorskite, sepiolite, chlorite, talc, pyrophyllite, micas (such as biotite muscovite, illite, glauconite, celadonite, and phengite) or mixtures thereof. A very preferably type of calcined clay is metakaolin.

As used herein, “slag” encompasses steel making slag, slag from other metallurgical process, and waste incineration slag. Especially, the slag is selected from granulated blast furnace slag (GBFS), basic oxygen furnace slag (BOF slag), ladle slag or electric arc furnace slag, most preferably from GBFS of BOF slag.

Compositions

The dry cementitious composition according to embodiments comprises one or more luminescent compounds and a cementitious binder.

Luminescent compounds suitable for application in disclosed compositions include organic and/or inorganic compounds/pigments. They may include, but are not limited to, luminescence aggregate>1 mm, luminescence aggregate-1 350 mesh, luminescence aggregate ultra fine, luminescence aggregate-2 350 mesh, and luminescence aggregate 45 to 70 μm.

Other luminescent compounds may include phosphorescent strontium aluminate particles. Strontium aluminate having a formula of $SrAl_2O_4$ is a nonflammable, pale yellow, monoclinic crystalline powder. Strontium aluminate may be present in other formulae such as $SrAl_4O_7$ with a monoclinic crystalline structure, $Sr_3Al_2O_6$ with a cubic crystalline structure, $SrAl_{12}O_{19}$ with a hexagonal crystalline structure, and $Sr_4Al_{14}O_{25}$ with an orthorhombic crystalline structure. In one or more embodiments, the phosphorescent strontium aluminate particles used herein comprise strontium aluminate with a formula of $SrAl_2O_4$. It is equally envisaged that strontium aluminate with other formulae including, but not limited to, $SrAl_4O_7$, $Sr_3Al_2O_6$, $SrAl_{12}O_{19}$, and $Sr_4Al_{14}O_{25}$ may be used in addition to, or in lieu of $SrAl_2O_4$. Also suitable are zinc sulfide co-doped with copper (ZnS:Cu) and rare earth ions such as Eu3+, Gd3+, Tb3+, Dy3+, Sm3+ embedded in at least one of silicates, aluminates, aluminosilicates, titanates, phosphates, sulfides, and borates.

Luminescent compounds used in disclosed compositions are generally selected based on classifications or groupings according to particle size. Any suitable particle size classifications known to those skilled in the art are contemplated by this disclosure, e.g., mesh sizing, average particle diameter, median particle diameter, volume displacement, or the like.

For example, the particle size can be determined by laser diffraction as described in ISO 13320:2009. Preferably, a particle size of non-spherical or irregular particles is represented by the equivalent spherical diameter of a sphere of equivalent volume. In embodiments, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range. As such, particle sizes always refer to an ensemble of particles. A particle size D50 refers to the particle size where 50% of the particles are bigger and 50% of the particles are smaller. The particle size D50 is also meant to be the mean or average particle diameter.

In preferred embodiments, two types of luminescent compounds may be present in the dry composition or applied cementitious mixture. The two types of luminescent compounds may include a first luminescent compound comprising a plurality of particles having a first average particle diameter, and a second luminescent compound comprising a plurality of particles having a second average particle diameter smaller than the first average particle diameter.

In other preferred embodiments, three types of luminescent compounds may be present in the dry composition or applied cementitious mixture. That is, a third luminescent compound comprising a plurality of particles having a third average particle diameter smaller than the second average particle diameter.

An overall particle size distribution of the two or three types of luminescent compounds may have a multimodal, e.g., bimodal or trimodal, particle size distribution where peaks of the distribution correspond to a first luminescent compound having a particle size distribution defined in terms of percentage of particles, e.g., 50 to 100%, 60 to 100%, 70 to 99.9%, 90 to 99.9%, or 98 to 99.9%, meeting a first preset size range, a second luminescent compound having a particle size distribution defined in terms of percentage of particles, e.g., 50 to 100%, 60 to 100%, 70 to 99.9%, 90 to 99.9%, or 98 to 99.9%, meeting a second preset size range different from the first preset size range, and/or a third luminescent compound having a particle size distribution defined in terms of percentage of particles, e.g., 50 to 100%, 60 to 100%, 70 to 99.9%, 90 to 99.9%, or 98 to 99.9%, meeting a third preset size range different from the first and second preset size ranges.

In general, the first average particle diameter and/or preset particle size range may be understood to be greater than 0.75 mm, greater than 1 mm, greater than 2 mm, or greater than 3 mm, or in a range of 0.75 mm to 3 mm, 0.75 mm to 2 mm, or 1 mm to 2 mm, the second average particle diameter and/or preset particle size range may be understood to be 3 mm or less, 2 mm or less, 1 mm or less, or 0.75 mm, or in a range of 0.01 μm to 3 mm, 0.1 μm to 2 mm, 0.1 μm to 1 mm, or 1 μm to 0.75 mm, and the third average particle diameter may be understood to be less than 1 mm, less than 0.1 mm, less than 10 μm, or less than 0.1 μm, or in a range of 0.01 μm to 1 mm, 0.1 μm to 50 μm, 0.1 μm to 10 μm, or 0.1 μm to 1 μm.

It is believed, without intending to be bound by theory, that including luminescent compounds of varying particle dimensions optimizes particle size distribution or gradation and packing. For example, using two types of luminescent compounds exhibits better particle size distribution or gradation and packing and therefore better luminescence than using one type of luminescent compound (or no luminescent compound). Additionally, using three types of luminescent compounds exhibits even better particle size distribution or gradation and packing and therefore better luminescence than using one or two types of luminescent compound (or no luminescent compound). Furthermore, it is believed that other components in the cementitious composition, especially further aggregates and fillers, affect the particle size distribution or gradation and packing of the luminescent compounds contained therein. For example, it is believed that calcium carbonate reduces luminescent properties by reducing dispersion of the luminescent compounds. Furthermore, it is believed that am optimized gradation of further aggregates and fillers can help increase the luminescence of a cured object.

In embodiments, the other additives, such as calcium carbonate, may be included in the dry composition and/or the applied cementitious mixture such that a ratio of a total amount of the one or more luminescent compounds to an amount of the calcium carbonate in the dry composition and/or the applied cementitious mixture is controlled to be in a range of 0.10 to 1.00, 0.41 to 0.81, or preferably 0.41 to 0.74. Within these ranges, it was observed that quenching of luminescence by the calcium carbonate was minimized and the dry composition and/or the applied cementitious mixture was therefore optimized for luminescence.

The large diameter luminescent compounds having the first average particle diameter (e.g., >1 mm) may be present in the dry composition in a range of 0.1 to 20 wt %, 1 to 10 wt %, or 2 to 8 wt %, relative to a total weight of the dry composition. The medium diameter luminescent compounds having the second average particle diameter (e.g., 0.1 μm to 1 mm) may be present in the dry composition in a range of 0.1 to 20 wt %, 1 to 10 wt %, or 2 to 8 wt %, relative to a total weight of the dry composition. The small diameter luminescent compounds having the third average particle diameter (e.g., <0.1 μm) may be present in the dry composition in a range of 0.1 to 20 wt %, 1 to 10 wt %, or 2 to 8 wt %, relative to a total weight of the dry composition.

A ratio of an amount of the first luminescent compound to an amount of the second luminescent compound in the dry cementitious composition may be in a range of 0.1:10 to 10:0.1, 1:5 to 5:1, or preferably, 1:3 to 3:1. A ratio of an amount of the first luminescent compound to a total of an amount of the second luminescent compound and the third luminescent compound in the dry cementitious composition may be in a range of 0.1:10 to 10:0.1, 1:5 to 5:1, or preferably, 1:2 to 2:1.

The dry cementitious composition may comprise, relative to a total dry weight of the composition, in a range of 20 to 75 wt % of the cementitious binder, and in a range of to 50 wt %, preferably 10 to 40 wt %, of the one or more luminescent compounds. The cementitious binder may include at least one cement, at least one of slag and calcined clay, optionally at least one activator for the slag, optionally further aggregates and/or fillers, and optionally further additives.

A cement within the present context is a Portland cement of the type CEM I, CEM II, or CEM IV (according to standard EN 197-1) or a calcium aluminate cement (according to standard EN 14647:2006-01) or a calcium sulphoaluminate cement or a mixture thereof. Of course, cements produced according to relevant alternative standards, for example the relevant ASTM or Chinese standards, are likewise suitable. Furthermore, white cement can be used as a mineral binder of the present invention. A cement according to embodiments may comprise up to 40 wt.-%, preferably up to 35 wt.-%, especially up to 20 wt.-%, each based on the total dry weight of the cement, of calcium sulfate. The calcium sulfate may be present in the form of calcium sulfate-hemihydrate, calcium sulfate-dihydrate and/or anhydrite. A cement of the disclosed embodiments may also comprise one or more pozzolanes and/or latent hydraulic materials chosen from clay, calcined clay, especially metakaolin, kiln dust, microsilica, fly ash, pyrogenic silica, precipitated silica, silica fume, zeolite, rice husk ash, burnt oil shale, and natural pozzolanes such as pumice, trass, and finely ground limestone.

Especially, the at least one cement is a mixture of Portland cement and/or calcium aluminate cement and/or calcium sulphoaluminate cement in a weight ratio of 20:1 to 1:1, more preferably 10:1 to 2:1. Optionally, metakaolin is additionally present. The slag, the activator for the slag, and the types of luminescent compounds are as described above. A suitable further filler is superfine limestone. Preferably, superfine limestone has a particle size of 0 to 50 μm, preferably 0.1 to 10 μm. It is especially preferred that shrinkage reducing agents and superplasticizers are additionally present as further additives According to embodiments, the at least one cement is selected from Portland cement of the type CEM I, CEM II, CEM III, CEM IV, or CEM V according to standard EN 197-1, calcium aluminate cement according to standard EN 14647:2006-01, calcium sulfoaluminate cement, puzzolane, latent hydraulic binder, or mixtures thereof.

According to embodiments, in a method of the disclosed embodiments, the at least one cement is a cement of type CEM I, CEM II or CEM IV according to standard EN 197-1, optionally comprising up to 40 wt.-%, preferably up to 35 wt.-%, especially up to 20 wt.-%, each based on the total dry weight of the cement, of calcium sulfate.

In a method of the disclosed embodiments, the at least one cement is a mixture of Portland cement of type CEM I according to standard EN 197-1 with a calcium aluminate cement according to standard EN 14647:2006-01 and/or a calcium sulphoaluminate cement, preferably a calcium sulphoaluminate cement. Preferably, a weight ratio of Portland cement to calcium aluminate and/or calcium sulphoaluminate cement is 20:1 to 1:1, more preferably 10:1 to 2:1.

According to embodiments, the cementitious material is a mixture of Portland cement and slag, where a weight ratio of Portland cement to slag is 1:2 or higher, especially between 1:2 and 10:1. It has been found that such weight ratios of Portland cement to slag lead to a favorable heat release from the 3-dimensional object during printing and curing thereof. Where a weight ratio higher than 10:1 is used, i.e. where more Portland cement relative to slag is used, more heat is released in shorter time. The latter may lead to inhomogeneous curing and/or cracking. Especially, the weight ratio of Portland cement to slag is such, that the maximum heat release from the 3-dimensional object during printing and curing is half of the value of the same 3-dimensional object when only Portland cement is used. The maximum heat release can be determined from heat flow curves measured in an isothermal process as described in standard ASTM C1702-17, for example measured on an instrument i-CAL 8000 from Calmetrix. An especially preferred weight ratio of Portland cement to slag is 1:1.3.

The at least one activator is preferably chosen from oxides, hydroxides, hydrogen carbonates, carbonates, silicates and sulfates of alkali metals or alkaline earth metals.

Especially, the particles of the aggregates can have any spherical and/or non-spherical geometric shape, either uniform or non-uniform. For example, the particles can be spherical-, conical-, polygonal-, cubic-, pentagon-, hexagon-, octagon-, prismatic and/or polyhedral-shaped, circular, elliptical, oval, square, rectangular, triangular or with polygonal cross sections.

The cementitious composition according to embodiments may additionally comprise further aggregates and/or fillers. Any further aggregate and/or filler can be aggregates and/or fillers normally used in cementitious materials and having a particle density that is >2'000 kg/$m^3$, preferably >2'100 kg/$m^3$, especially >2'200 kg/$m^3$. The particle density can be measured according to standard EN 1097-6:2013. In particular, the further aggregates and/or fillers are selected from calcareous, silico calcareous materials, and/or metallic aggregates. Examples of suitable further aggregates and/or fillers include sand, quartz, calcium carbonate, gravel, basalt, metallic aggregates, and/or construction demolition waste, especially from sand and/or calcium carbonate. Calcium carbonate is especially meant to include limestone and dolomite. Calcium carbonate and ultra-fine limestone are a particularly preferred further aggregate and/or filler. Ultrafine limestone is characterized by a mean particle size of not more than 63 microns, especially between 1 to 50 microns.

It is possible to optimize the particle size distribution or gradation and packing of any or all of further aggregate, filler, and luminescent aggregate to increase at least one of pumpability, printability, buildability, thixotropic behavior/rheology, and luminescent properties of the cementitious composition.

The cementitious composition according to embodiments may additionally comprise further additives. Further additives are selected from accelerators, retarders, rheology modifiers, plasticizers, superplasticizers, water retention agents, redispersible polymers, anti-shrinkage agents, anticorrosion agents, hydrophobizing agents, color pigments, biocides, air-entraining agents, fibers, and/or defoamers.

A cementitious composition according to embodiments may comprise an additional additive selected from accelerator, superplasticizers and/or anti-shrinkage agent. An addition of fibers, such as steel fibers, cellulose fibers, PE fibers, or PP fibers is possible and especially suitable to increase the flexural strength.

According to embodiments of disclosed methods, an additional additive, preferably an accelerator, may be admixed during conveying or in the print head.

Particularly preferred accelerators are alkali metal or alkaline earth metal chlorides, nitrates, nitrites, thiocyanates, calcium silicate hydrates, aluminum sulphates, and mixtures thereof. Accelerators may be added in powder form or in the form of aqueous suspensions or solutions. The addition in the form of aqueous suspensions or solutions is generally preferred because it allows for more precise metering and better mixing. The amount of accelerator added may vary in a wide range but typically is between 0.1 to 10 wt % relative to the dry weight of cement.

Superplasticizer within the present context are selected from lignosulphonates, sulfonated melamine formaldehyde resins, and polycarboxylate ethers or esters. Especially preferably, polycarboxylate ethers or esters, which are abbreviated throughout this invention as PCE.

polycarboxylate ethers or esters (PCE) of the disclosed embodiments comprise (i) repeating units A of the general structure (I)

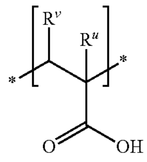

(I)

and (ii) repeat units B of the general structure (II),

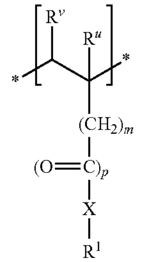

(II)

wherein each $R^u$ independently represents hydrogen or a methyl group, each $R^v$ independently represents hydrogen or COOM, wherein M independently is H, an alkali metal, or an alkaline earth metal, m=0, 1, 2 or 3, p=0 or 1, X independently of each other is O or NH, each R1 is independently $—(CH_2)_z—[YO]_n—R^4$, where Y is a $C_2$ to $C_4$ alkylene and $R^4$ is H, $C_1$ to $C_{20}$ alkyl, -cyclohexyl, -alkylaryl, or a $—N(—R^i)_j—[(CH_2)_z—PO_3M]_{3-j}$, z=0, 1, 2, 3, or 4 n=2-350, j=0, 1 or 2, $R^i$ represents a hydrogen atom or an alkyl group having 1-4 carbon atoms, and M represents a hydrogen atom, an alkali metal, an alkaline earth metal or an ammonium ion, and wherein the repeating units A and B in the PCE have a molar ratio of A:B in the range of 10:90-90:10.

Preferably, PCE of the disclosed embodiments consist to at least 50 mol %, more preferably at least 75 mol %, especially at least 90 mol % of repeating units A and B. Repeating units A and B may be arranged randomly, alternating, block-wise or with a gradient structure.

PCE of the disclosed embodiments can be prepared by processes of radical polymerization of suitable monomers. Suitable conditions for carrying out free radical polymerization are known to the skilled person per se and are described, for example, in EP 1103570 (Nippon Shokubai). PCE of the disclosed embodiments can be prepared by a polymer-analogous esterification reaction. Suitable processes for the preparation of PCE of the disclosed embodiments by polymer-analogous esterification are known to the skilled person per se and are described, for example, in EP 1138697 (Sika AG).

Of course, mixtures of different PCE can be used in the context of the disclosed embodiments, and the PCE can be in liquid and/or solid form.

Suitable shrinkage reducing agents (SRA) are selected from oxyalkylene glycols, alkyl ether oxyalkylene glycols, $C_4$-$C_6$ alcohols, alkoxylated polyols, such as alkoxylated glycerine and alkoxylated erythritol, aminoalcohols, alkoxylated alkyl amines, fluorinated surfactants. SRA may be suitably combined with expansive MgO, superabsorbent polymers, or defoamers.

In one particular embodiment, the dry cementitious composition comprises, relative to a total dry weight of the composition, 15 to 40 wt % of cement, 3 to 7 wt % of at least one of calcium aluminate cement and calcium sulfoaluminate cement, 0 to 35 wt % of at least one of slag and calcined clay, 4 to 12 wt % of one or more luminescent compounds, 5 to 60 wt % of further at least one of aggregates and fillers, and 1 to 2 wt % of further additives.

In another particular embodiment, the dry cementitious composition comprises, relative to a total dry weight of the composition, 15 to 40 wt % of Portland cement, 3 to 7 wt % of calcium aluminate cement and/or calcium sulfoaluminate cement, 0 to 35 wt % of slag and/or calcined clay, 4 to 12 wt % of one or more luminescent compounds of different particle size, 5 to 60 wt % of further aggregates and/or fillers, especially of calcareous or silico-calcareous aggregates and/or fillers, and 1 to 2 wt % of further additives In another particular embodiment, the dry cementitious composition comprises, relative to a total dry weight of the composition, 20 to 30 wt % of Portland cement, 3 to 7 wt % of calcium aluminate cement and/or calcium sulfoaluminate cement, 0 to 15 wt % of ground granulated blast furnace slag or basic oxygen furnace slag, optionally 0.1 to 1 wt % of at least one activator for said slag 4 to 12 wt % of at least two types of luminescent compounds of different particle size, 40 to 60 wt % of sand, calcium carbonate, superfine limestone, or mixtures thereof, 1 to 2 wt % of superplasticizers, thickeners, shrinkage reducing agents, defoamer or mixtures thereof.

Systems

A system for printing a luminescent 3-dimensional object according to embodiments comprises a mixing device configured to mix a dry cementitious composition with water, the dry cementitious composition comprising a cementitious binder, and a conveyor configured to convey the mixture to a print head, the print head being configured to apply the mixture and one or more luminescent compounds from the print head to form a luminescent 3-dimensional object.

FIG. 1 schematically shows a system 1 for carrying out a process according to embodiments.

The system 1 comprises a movement device 2 with a movable arm 2.1. A print head 3 is attached to the free end of the arm 2.1, which can be moved by the arm 2.1 in all three spatial dimensions. This allows the print head 3 to be moved to any position in the working area of the movement device 2.

Inside, the print head 3 has a tubular passage 3.1 extending from the end face facing the arm 2.1 (at the top in FIG. 1) to the opposite and free end face for the passage of mixture of cementitious material with water. At the free end, the passage 3.1 opens into a controllable outlet 4 in the form of a nozzle which may be continuously openable and closable.

An inlet nozzle 5 for adding an additive opens laterally into the passage 3.1 in a region facing the arm 2.1. Through the inlet nozzle 5, an additive, for example a rheological aid, can be added to the mixture of cementitious material with water moving through the passage 3.1 as required.

Furthermore, inside the print head 3 downstream with respect to the inlet nozzle, a static mixer 6 is arranged in the passage 3.1, which additionally mixes the mixture of cementitious material with water and the optional additive.

In the area of the controllable outlet 4, a measuring unit 8 is arranged for determining the pressure in the tubular passage 3.1. A sampling rate of the measuring unit 8 is, for example, 10 Hz.

A device 7 for deaerating the mixture of cementitious material with water is also attached to the print head 3. The device is designed as a vacuum treatment device and makes it possible to reduce the air content in the mixture of cementitious material with water. For this purpose, for example, a section of the wall of the passage 3.1 can be designed as a gas-permeable membrane, so that air is drawn out of the mixture of cementitious material with water by applying a vacuum outside the passage 3.1.

The system 1 for applying a mixture of cementitious material with water also has a feed device 9 which corresponds on the input side with containers 11.1, 11.2, 11.3, and 11.4. Container 11.1 contains the first component, which is a dry cementitious composition according to embodiments. The second component, which is present in the second container 11.2 includes water. The third component, which is present in the third reservoir 11.3 includes types of luminescent compound. In the additive reservoir 11.4 is a further additive, for example a superplasticizer in the form of a polycarboxylate ether or a rheological aid.

On the output side, the feed device 9 has at least two, optionally three separate outlets, each of which is connected to one of inlets 10.1, 10.2, and 10.3 of a mixing device 10. The feed device 9 also has individually controllable metering devices (not shown in FIG. 1), so that the individual components in the individual containers 11.1, 11.2, 11.3, and 11.4 can be metered individually into the mixing device 10.

A further outlet of the feed device is connected to the inlet nozzle 5 (not shown in FIG. 1), so that optional additive can be fed from the additive reservoir 11.4 into the inlet nozzle 5 via a further metering device of the feed device 9.

The mixing device 10 is designed as a static mixer or as a dynamic mixer, preferably as a continuous dynamic mixer and may comprise, in addition thereto, an integrated conveying device in the form of a screw conveyor. In the mixing device, the individually metered components are mixed together and conveyed into the flexible line 12 attached to the outlet side of the mixing device. In operation, the mixing and conveying of the mixture of cementitious material with water can take place continuously.

Figure 2:
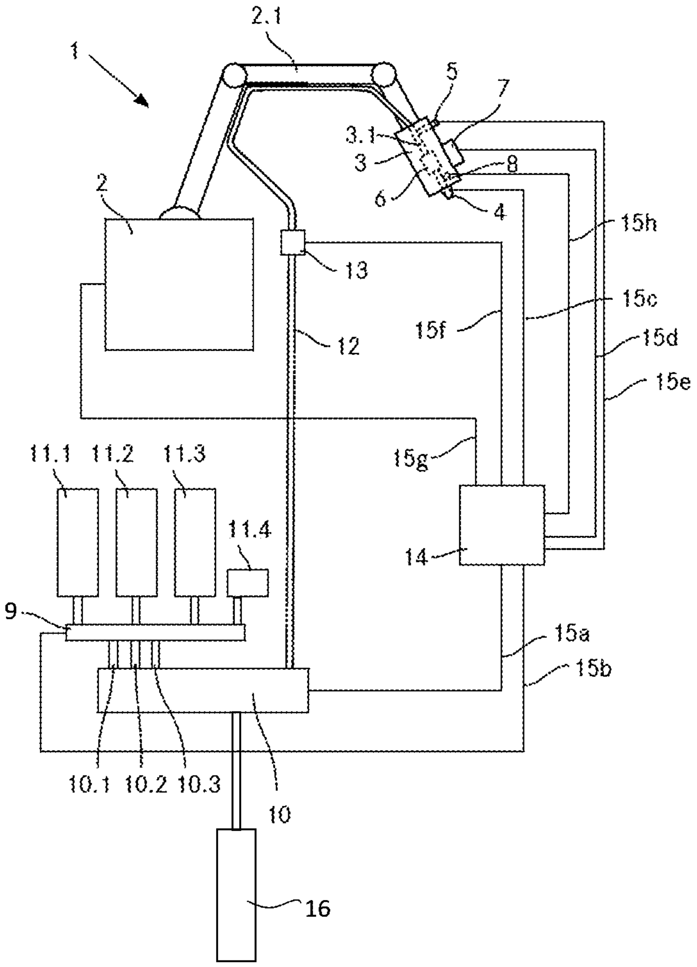
FIG. 2 is a schematic diagram of a system for producing a luminescent 3-dimensional object with an additive manufacturing process according to another embodiment.

In other embodiments, the types of luminescent compound may be added directly into the slurry in the mixing device via reservoir 16, shown in FIG. 2. In this embodiment, the container 11.3 may be optional and may include the further additives, i.e., the superplasticizer in the form of the polycarboxylate ether or the rheological aid. In still other embodiments, the luminescent compound(s) may be added via the inlet nozzle 5 discussed above in form of, for example, particles or as a suspension.

The mixture of cementitious material with water and the types of luminescent compounds can be conveyed into the print head 3 via the conveyor or flexible line 12, which opens into the tubular passage 3.1 at the end of the print head facing the arm 2.1, and continuously applied through the controllable outlet 4.

Also part of the system 1 is a measuring unit 13, which is integrated into the delivery line 12 in the area between the mixing device 10 and the print head 3. The measuring unit includes, for example, an ultrasonic transducer which is designed to determine the flow properties of the mixture of cementitious material with water. A sampling rate of the measuring unit 13 is, for example, 10 Hz.

A central control unit 14 of the system 1 includes a processor, a memory unit, and a plurality of interfaces for receiving data and a plurality of interfaces for controlling individual components of the system 1.

In this regard, the mixing device 10 is connected to the control unit 14 via a first control line 15*a*, while the feeding device is connected to the control unit 14 via a second control line 15*b*. As a result, the individual components in the containers 11.1, 11.2, and 11.3 can be metered into the mixing device 10 via the central control unit in accordance with predetermined recipes stored in the control unit and conveyed into the flexible line 12 at adjustable conveying rates.

The controllable outlet 4, the inlet nozzle 5, and the device 7 for deaerating the mixture of cementitious material with water at the print head are each connected to the control unit 14 via a separate control line 15*c*, 15*d*, 15*e* as well and can be controlled or monitored by the latter.

The movement device 2 is also connected to the control unit 14 via a further control line 15*g*. This means that the movement of the print head 3 can be controlled via the control unit 14.

The measuring unit 8 is connected to the control unit 14 by a data line 15*h*, so that print data recorded in the measuring unit can be transmitted to the control unit 14.

Similarly, the measuring unit 13 is connected to the control unit 14 by a data line 15*f*, so that data recorded in the measuring unit characterizing the flow properties can be transmitted to the control unit 14.

The control unit 14 is thereby programmed, for example, in such a way that:

(i) the dosing addition rates of the components with the feeding device 9 are controlled depending on the flow properties of the mixture of cementitious material with water in the flexible line 12 determined via the measuring unit 13;

(ii) the feeding device integrated in the mixing device 10 is controlled depending on the pressure determined via the measuring unit 8 and the structure of the 3-dimensional object to be produced with the material of the present invention;

(iii) the addition rate of the additive via the inlet nozzle 5 is controlled depending on the flow properties of the mixture of cementitious material with water determined via the measuring unit 13 and the structure of the 3-dimensional object to be produced;

(iv) the degree of deaeration of the mixture of cementitious material with water in the apparatus 7 is controlled in accordance with the flow properties of the mixture of cementitious material with water detected via the measuring unit 13;

(v) the movement device 2, and thus the position of the print head 3, is controlled in dependence on a model of the 3-dimensional object to be produced stored in the data memory of the control unit 14.

Additionally, the programmable logic behind the dosing and addition rates can be refined in the field in response to real-time real-world conditions and performance at the site. And adjustments to dosing and addition rates can be made virtually instantaneously. As a result, the disclosed embodiments will provide real-time and more effective control management compared to conventional processes by improving the overall reliability, efficiency, and economic productivity of the system 1.

Embodiments may further include machine learning algorithms implemented on the disclosed controllers for executing the disclosed functions in a predictive manner. For example, the machine learning algorithms may be used to establish historical patterns to predict future feed needs based on any one or more parameters of the system.

Methods

A method of printing a luminescent 3-dimensional object according to embodiments comprises mixing a dry cementitious composition with water, the dry cementitious composition comprising a cementitious binder, conveying the mixture to a print head, applying the conveyed mixture and one or more luminescent compounds from the print head to form a luminescent 3-dimensional object, and curing the luminescent 3-dimensional object.

In embodiments, the dry cementitious composition may include the one or more luminescent compounds. Alternatively, the one or more luminescent compounds may be added to the mixture at the print head via, for example, the inlet.

The methods may include controlling a total amount of the one or more luminescent compounds to an amount of other additives, such as calcium carbonate, in the dry composition and/or the applied cementitious mixture to be in a range of 0.10 to 1.00, 0.41 to 0.81, or preferably 0.41 to 0.74. This allows for optimizing luminescence and is believed to occur by minimizing quenching of luminescence by the calcium carbonate.

The mixing is preferably performed such that the dry cementitious composition is mixed with water in a water to powder weight ratio of 0.2 to 1.0, preferably 0.2 to 0.6, and more preferably 0.25 to 0.6, and then left to cure to a luminescent 3-dimensional object which has a density of not more than 1800 $kg/m^3$, preferably not more than 1350 $kg/m^3$, and has a compressive strength of at least 15 MPa after 1 day of curing according to standard ASTM C109 after 1 day of curing.

The shape and size of a luminescent 3-dimensional object obtained by a method of the disclosed embodiments is not particularly limited. It may range in height from a few centimeters to several meters, e.g., 0.01 m to 4 m, 0.1 m to 3 m, or 1 m to 2 m. It may be of considerable height, for example higher than 2 m or higher than 10 m, and even as high as 50 m. The density of not more than 1800 $kg/m^3$, preferably not more than 1350 $kg/m^3$, of the cured 3-dimensional object and the compressive strength of at least 15 MPa after 1 day of curing enable such height.

A luminescent 3-dimensional object of the disclosed embodiments may be a building or part of a building. It may be a load bearing structure or part of a load bearing structure or it may be a decorative object.

According to embodiments, luminescent 3-dimensional objects of the disclosed embodiments are used as decoration such as, for example, building materials, columns, fountains, pools, facades, fences, barriers, sculptures, pavers, and/or garden amenities.

According to further embodiments, a luminescent 3-dimensional object of the disclosed embodiments is a thermal and/or acoustic insulation panel or forms part of a thermal and/or acoustic insulation system.

Figure 4:
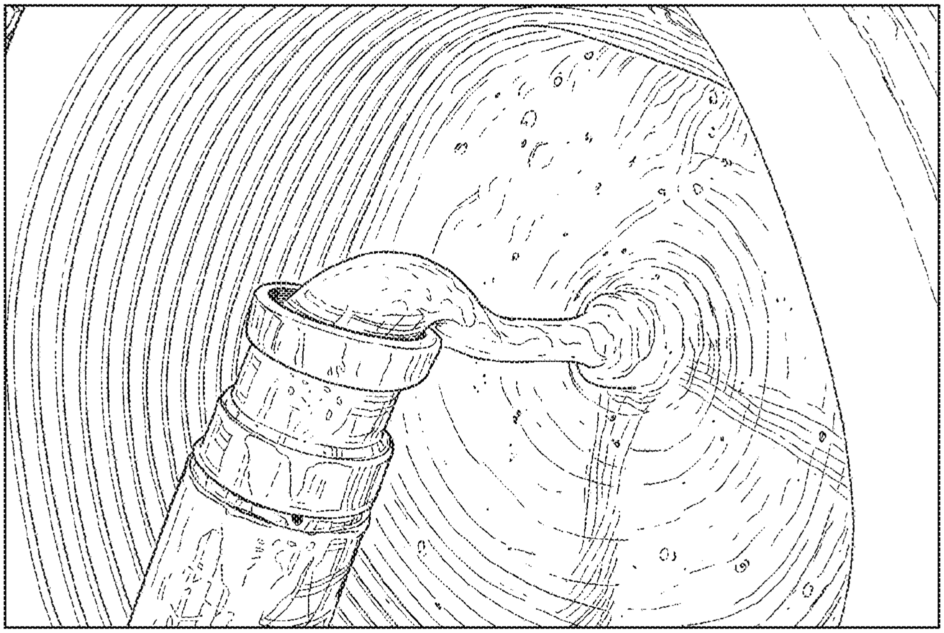
FIG. 4 is a photograph illustrating a step of applying a mixture of a cementitious material, water, and a luminescent compound into a mold to form a luminescent 3-dimensional object.
Figure 3:
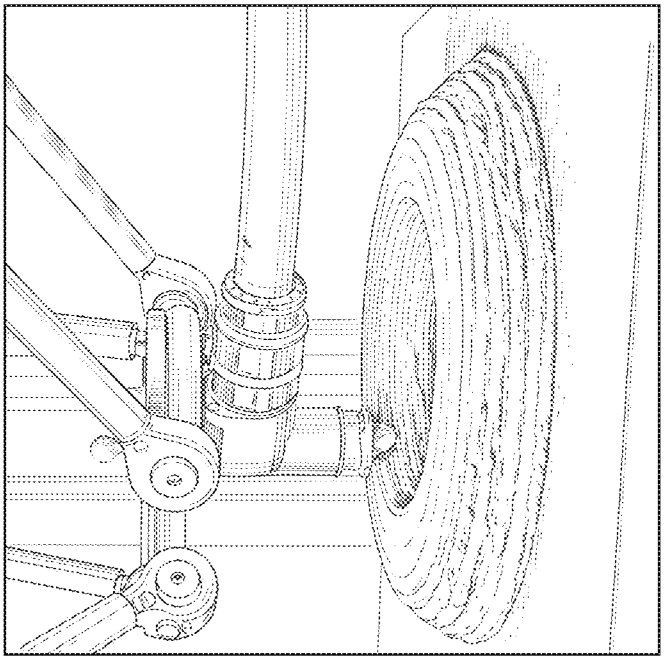
FIG. 3 is a photograph illustrating a step of applying a mixture of a cementitious material, water, and a luminescent compound layer-by-layer from a print head to form a luminescent 3-dimensional object.
Figure 5B:
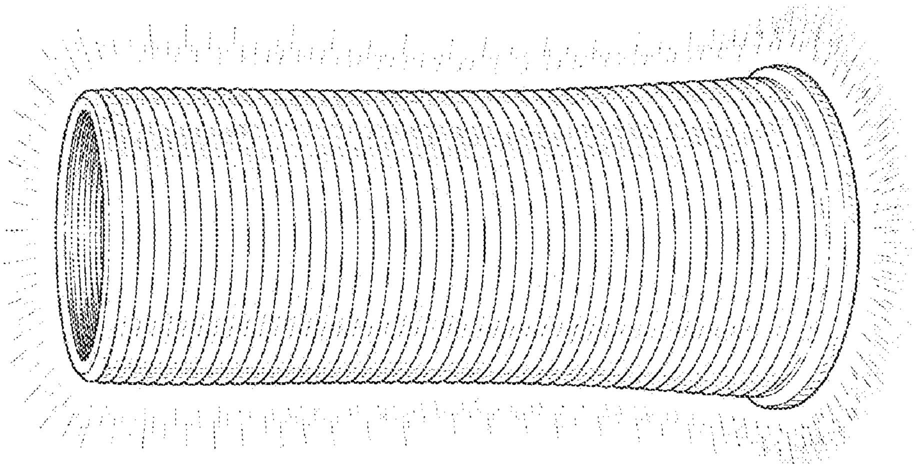
FIG. 5B is a photograph of a luminescent 3-dimensional object according to an embodiment luminescing in darkness.
Figure 5A:
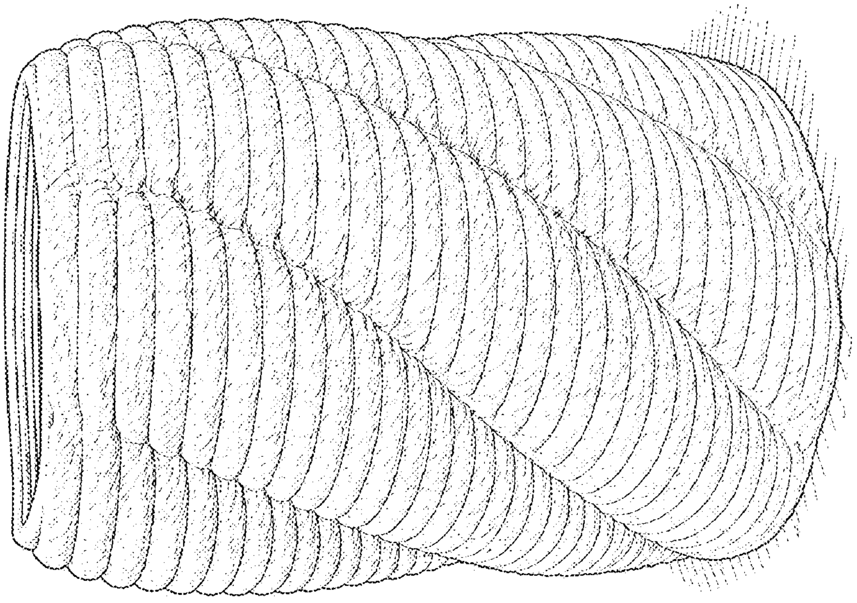
FIG. 5A is a photograph of a luminescent 3-dimensional object according to an embodiment in daylight.

FIG. 3 illustrates a step of applying a mixture of a cementitious material, water, and a luminescent compound layer-by-layer from a print head to form a luminescent 3-dimensional object. FIG. 4 illustrates a step of applying a mixture of a cementitious material, water, and a luminescent compound into a mold to form a luminescent 3-dimensional object. FIG. 5A illustrates a cured luminescent 3-dimensional object according to embodiments in daylight. FIG. 5B illustrates a photograph of a luminescent 3-dimensional object according to embodiments luminescing in darkness. As seen in FIG. 5B, uniform luminescence was observed.

EXAMPLES

The following table 1 shows compositions E-1 to E-7 and C-1 to C-12 obtained by thoroughly mixing the individual components in a Hobart mixer until visually homogeneous. In the compositions, commercially-available Aqua Blue>1 mm was used as the large diameter luminescent compound (>1 mm), commercially-available Aqua Blue 350 mesh was used as the medium diameter luminescent compound (0.1 μm to 1 mm), and commercially-available Aqua Blue Aggregate Ultra Fine was used as the small diameter luminescent compound (<0.1 μm).

Additives are a mixture of accelerators, retarders, rheology modifiers, superplasticizers, water retention agents, and redispersible polymers.

PCE was used as superplasticizer in an amount of 0.2 wt % relative to the total dry weight of the respective composition in examples E-1 and E-3 and C-1 to C-6 and C-8 to C-10, in an amount of 0.213 wt % in examples E-2 and E-4, in an amount of 0.225 wt % in examples E-5 to E-7 and C-7, C-11, C-12. In all cases, the PCE used was a copolymer of polyacrylic acid esterified with methyl-terminated polyethylene glycol (0.15 mol per 1 mol of carboxylate groups).

TABLE 1 example composition (in g)

| Material Name | E-1 (Lum-5) % | E-1 (Lum-5) Batch Weight | E-2 (Lum-5a) % | E-2 (Lum-5a) Batch Weight | E-3 (Lum-6) % | E-3 (Lum-6) Batch Weight | E-4 (Lum-6a) % | E-4 (Lum-6a) Batch Weight | E-5 (Lum-13) % | E-5 (Lum-13) Batch Weight | E-6 (Lum-13a) % | E-6 (Lum-13a) Batch Weight | E-7 (Lum-21) % | E-7 (Lum-21) Batch Weight |
|---|---|---|---|---|---|---|---|---|---|---|---|---|---|---|
| DENKA CSA (bag) | 4 | 80 | 4 | 120 | 4 | 80 | 4 | 120 | 4 | 80 | 4 | 80 | 4 | 80 |
| RWC White Portland cement (bigbag) | 30 | 600 | 30 | 900 | 30 | 600 | 30 | 900 | 30 | 600 | 30 | 600 | 30 | 600 |
| Sand 50/140 (0.1-0.3 mm) | 6.425 | 128.5 | 6.4125 | 192.375 | 6.425 | 128.5 | 6.4 | 192 | 8.425 | 168.5 | 8.425 | 168.5 | 8.425 | 168.5 |
| Sand 30/65 | 23.5 | 470 | 23.5 | 705 | 23.5 | 470 | 23.5 | 705 | 23.5 | 470 | 23.5 | 470 | 23.5 | 470 |
| Sand 20/30 | 8.5 | 170 | 8.5 | 255 | 2.5 | 50 | 2.5 | 75 | 8.5 | 170 | 8.4965 | 169.93 | 8.4965 | 169.93 |
| Calcium Carbonate 325 (90/100) | 14.806 | 296.12 | 14.806 | 444.18 | 14.806 | 296.12 | 14.806 | 444.18 | 10.781 | 215.62 | 10.781 | 215.62 | 10.781 | 215.62 |
| Aqua Blue >1 mm | 2 | 40 | 2 | 60 | 8 | 160 | 8 | 240 | 2 | 40 | 6 | 120 | 2 | 40 |
| Aqua Blue 350 mesh | 2 | 40 | 2 | 60 | 2 | 40 | 2 | 60 | 6 | 120 | 2 | 40 | 6 | 120 |
| Aqua Blue Aggregate Ultra Fine | 2 | 40 | 2 | 60 | 2 | 40 | 2 | 60 | | | | | | |
| Safety Yellow-350 Mesh | | | | | | | | | | | | | | 0 |
| Ground calcium carbonate | 5 | 100 | 5 | 150 | 5 | 100 | 5 | 150 | 5 | 100 | 5 | 100 | 5 | 100 |
| Additives | 1.769 | 35.38 | 1.7815 | 53.445 | 1.769 | 35.38 | 1.794 | 53.82 | 1.794 | 35.88 | 1.7975 | 35.95 | 1.7975 | 35.95 |
| Phosphates-Aqua Blue | | | | | | | | | | | | | | |
| TOTAL | 100 | 2000 | 100 | 3000 | 100 | 2000 | 100 | 3000 | 100 | 2000 | 100 | 2000 | 100 | 2000 |

| Material Name | C-1 (Lum-1) % | C-1 (Lum-1) Batch Weight | C-2 (Lum-2) % | C-2 (Lum-2) Batch Weight | C-3 (Lum-7) % | C-3 (Lum-7) Batch Weight | C-4 (Lum-8) % | C-4 (Lum-8) Batch Weight | C-5 (Lum-10) % | C-5 (Lum-10) Batch Weight | C-6 (Lum-11) % | C-6 (Lum-11) Batch Weight |
|---|---|---|---|---|---|---|---|---|---|---|---|---|
| DENKA CSA (bag) | 4 | 80 | 4 | 80 | 4 | 80 | 4 | 80 | 4 | 80.00 | 4 | 80 |
| RWC White Portland cement (bigbag) | 30 | 600 | 30 | 600 | 30 | 600 | 30 | 600 | 30 | 600.00 | 30 | 600 |
| Sand 50/140 (0.1-0.3 mm) | 8.425 | 168.5 | 8.425 | 168.5 | 0.425 | 8.5 | 0.425 | 8.5 | 0.425 | 8.50 | 0.425 | 8.5 |
| Sand 30/65 | 23.5 | 470 | 23.5 | 470 | 23.5 | 470 | 23.5 | 470 | 23.5 | 470.00 | 23.5 | 470 |
| Sand 20/30 | 10.5 | 210 | 10.5 | 210 | 8.5 | 170 | 2.5 | 50 | 10.5 | 210.00 | 10.5 | 210 |
| Calcium Carbonate 325 (90/100) | 14.806 | 296.12 | 6.806 | 136.12 | 14.806 | 296.12 | 8.806 | 176.12 | 16.806 | 336.12 | 16.806 | 336.12 |
| Aqua Blue >1 mm | | | | | 2 | 40 | 8 | 160 | | | | |
| Aqua Blue 350 mesh | 2 | 40 | 10 | 200 | 2 | 40 | 8 | 160 | | | 8 | 160 |
| Aqua Blue Aggregate Ultra Fine | | | | | 8 | 160 | 8 | 160 | 8 | 160.00 | | |
| Safety Yellow-350 Mesh | | | | | | | | | | | | |
| Ground calcium carbonate | 5 | 100 | 5 | 100 | 5 | 100 | 5 | 100 | 5 | 100.00 | 5 | 100 |
| Additives | 1.769 | 35.38 | 1.769 | 35.38 | 1.769 | 35.38 | 1.769 | 35.38 | 1.769 | 35.38 | 1.769 | 35.38 |
| Phosphates-Aqua Blue | | | | | | | | | | | | |
| TOTAL | 100 | 2000 | 100 | 2000 | 100 | 2000 | 100 | 2000 | 100 | 2000 | 100 | 2000 |

TABLE 1-continued

| example composition (in g) | | | | | | | | | | | | |
|---|---|---|---|---|---|---|---|---|---|---|---|---|
| | C-7 (Lum-12) | | C-8 (Lum-16) | | C-9 (Lum-17) | | C-10 (Lum-18) | | C-11 (Lum-20) | | C-12 (Lum-22) | |
| | % | Batch Weight | % | Batch Weight | % | Batch Weight | % | Batch Weight | % | Batch Weight | % | Batch Weight |
| DENKA CSA (bag) | 4 | 80 | 4 | 80 | 4 | 80 | 4 | 80 | 4 | 80 | 4 | 80 |
| RWC White Portland cement (bigbag) | 30 | 600 | 30 | 600 | 30 | 600 | 30 | 600 | 30 | 600 | 30 | 600 |
| Sand 50/140 (0.1-0.3 mm) | 8.425 | 168.5 | 8.425 | 168.5 | 8.425 | 168.5 | 8.425 | 168.5 | 8.425 | 168.5 | 8.425 | 168.5 |
| Sand 30/65 | 23.5 | 470 | 23.5 | 470 | 23.5 | 470 | 23.5 | 470 | 23.5 | 470 | 23.5 | 470 |
| Sand 20/30 | 4.5 | 90 | 6.5 | 130 | 4.5 | 90 | 10.5 | 210 | 8.4965 | 169.93 | 10.5 | 210 |
| Calcium Carbonate 325 (90/100) | 14.781 | 295.62 | 10.81 | 216.2 | 12.8 | 256 | 14.806 | 296.12 | 10.781 | 215.62 | 10.781 | 215.62 |
| Aqua Blue >1 mm | 6 | 120 | 6 | 120 | 4 | 80 | | | 2 | 40 | | |
| Aqua Blue 350 mesh | 2 | 40 | 4 | 80 | 6 | 120 | | | 3 | 60 | 6 | 120 |
| Aqua Blue Aggregate Ultra Fine | | | | | | | | | | | | |
| Safety Yellow-350 Mesh | | | | | | | | | 3 | 60 | | |
| Ground calcium carbonate | 5 | 100 | 5 | 100 | 5 | 100 | 5 | 100 | 5 | 100 | 5 | 100 |
| Additives | 1.794 | 35.88 | 1.769 | 35.38 | 1.769 | 35.38 | 1.769 | 35.38 | 1.7975 | 35.95 | 1.7975 | 35.95 |
| Phosphates-Aqua Blue | | | | | | | 2 | 40 | | | | |
| TOTAL | 100 | 2000 | 100 | 2000 | 100 | 2000 | 100 | 2000 | 100 | 2000 | 100 | 2000 |

The dry compositions of above table 1 were mixed with water. Mixing was done at 23° C. on a Hobart mixer for 3 min at maximum speed. The following table 2 gives an overview of the performance measured.

Flow was measured according to standard ASTM C1437. Initial set-time was measured according to standard ASTM 266. Compressive strength was measured according to standard ASTM C109 after 24 hours, 7 days, and 28 days.

Luminescence, printability, extrusion pressure, and surface quality were judged from the visual appearance of material extruded from a printing system as described in FIG. 1. Material judged printable showed all of the following: individual layers show very limited sagging and do not flow, adhesion between layers is good, a minimum of three layers could be applied on top of each other.

It can be seen from the above results that high luminescence was observed for compositions E-1 to E-7. Compositions E-2 and E-5 to E-7 further exhibited good printability and extrusion pressure and had a smooth surface texture. In compositions C-1, and C-7 to C-12 luminescence was lower compared to compositions E-1 to E-7. In compositions C-2 to C-4, and C-6 the mixture set up too fast, and in composition C-5, the mixture was too dry.

The invention claimed is:

1. A method of printing a luminescent 3-dimensional object, the method comprising:

mixing a dry cementitious composition with water, the dry cementitious composition comprising a cementitious binder and calcium carbonate;

conveying the mixture to a print head;

applying the mixture and one or more luminescent compounds from the print head to form a luminescent 3-dimensional object;

TABLE 2 performance measured

| Results | E-1 (Lum-5) | E-2 (Lum-5a) | E-3 (Lum-6) | E-4 (Lum-6a) | E-5 (Lum-13) | E-6 (Lum-13a) | E-7 (Lum-21) |
|---|---|---|---|---|---|---|---|
| Observation | High luminescence. Needed PCE for printability. | High luminescence with good printability and extrusion pressure. Surface texture was smooth. | High luminescence Needed PCE for printability. | High luminescence with good extrusion pressure but very rough surface. | High luminescence with good printability and extrusion pressure. Surface texture was smooth. | High luminescence with good printability and extrusion pressure. Surface texture was smooth. | High luminescence with good printability and extrusion pressure. Surface texture was smooth. |
| Flow @ 5 min (mm) | 133.5 | — | 129 | — | 155 | — | 154 |
| Initial set time (min) | 23 | — | 17 | — | 18.5 | — | 35 |
| Compressive strength (Mpa) 24 hrs | 31 | — | 29.4 | — | 28.6 | — | 30 |
| Compressive strength (Mpa) 7 days | 43.6 | — | 45.6 | — | 49.9 | — | 55.9 |
| Compressive strength (Mpa) 28 days | 46.5 | — | 52.2 | — | 56.4 | — | 64 |

| Results | C-1 (Lum-1) | C-2 (Lum-2) | C-3 (Lum-7) | C-4 (Lum-8) | C-5 (Lum-10) | C-6 (Lum-11) |
|---|---|---|---|---|---|---|
| Observation | Luminescence was too low when observed visually. | Mix set up too fast and couldn't cast more than 1 cube. | Mix set up too fast. | Mix set up too fast. | Mix was too dry even after adding 4 grams of PCE. | Mix set up too fast. |
| Flow @ 5 min (mm) | 134 | 123 | 131 | 120.5 | — | 144 |
| Initial set time (min) | 34 | 9 | 16 | 8 | — | 13 |
| Compressive strength (Mpa) 24 hrs | 34.09 | — | 27.9 | 22.1 | — | 26.3 |
| Compressive strength (Mpa) 7 days | 55.5 | — | 37.8 | 25.1 | — | 52 |
| Compressive strength (Mpa) 28 days | 60.4 | — | 49.4 | 32.4 | — | 54.8 |

| Results | C-7 (Lum-12) | C-8 (Lum-16) | C-9 (Lum-17) | C-10 (Lum-18) | C-11 (Lum-20) | C-12 (Lum-22) |
|---|---|---|---|---|---|---|
| Observation | Luminescence was too low when observed visually. | Luminescence was too low when observed visually. | Luminescence was too low when observed visually. | Luminescence was too low when observed visually. | Luminescence was too low when observed visually. | Luminescence was too low when observed visually |
| Flow @ 5 min (mm) | 150.05 | 142.5 | 149 | 157 | 151 | 150 |
| Initial set time (min) | 23 | 18 | 20 | 34 | 24 | 22 |
| Compressive strength (Mpa) 24 hrs | 29.045 | 35.5 | 31.9 | 34.2 | 32.3 | 34.1 |
| Compressive strength (Mpa) 7 days | 43.4 | 47 | 49.8 | 52.3 | 53.9 | 55.6 |
| Compressive strength (Mpa) 28 days | 48.9 | 58.9 | 53.6 | 55.8 | 63.9 | 58.8 |

controlling a ratio of a total amount of the one or more luminescent compounds to an amount of the calcium carbonate in the applied mixture to be in a range of 0.41 to 0.81; and curing the luminescent 3-dimensional object, wherein the one or more luminescent compounds includes a first luminescent compound having a first average particle diameter, and a second luminescent compound having a second average particle diameter smaller than the first average particle diameter, wherein the first average particle diameter is greater than 1 mm, and the second average particle diameter is 1 mm or less, and wherein a ratio of an amount of the first luminescent compound to an amount of the second luminescent compound in the dry cementitious composition is in a range of 1:3 to 3:1.

2. The method according to claim 1, wherein the dry cementitious composition comprises the one or more luminescent compounds.

3. The method according to claim 1, wherein the print head includes an inlet and the one or more luminescent compounds are added to the mixture via the inlet of the print head.

4. The method according to claim 1, wherein the ratio of the total amount of the one or more luminescent compounds to the amount of the calcium carbonate is controlled to be in a range of 0.41 to 0.74.

5. The method according to claim 2, wherein the dry cementitious composition comprises, relative to a total dry weight of the composition, in a range of 20 to 75 wt % of the cementitious binder, and in a range of 4 to 12 wt % of the one or more luminescent compounds.

6. The method according to claim 1, further comprising controlling a total amount of the one or more luminescent compounds, relative to a total weight of the applied mixture, to be in a range of 4 to 12 wt % such that the cured 3-dimensional object has at least one of increased pumpability, printability, buildability, and rheology compared to a reference 3-dimensional object cured from an applied mixture having a total amount of one or more luminescent compounds outside a range of 4 to 12 wt % relative to a total weight of the applied mixture.

7. The method according to claim 1, wherein the cementitious binder comprises:

at least one cement, and at least one of slag and calcined clay.

8. The method according to claim 7, wherein the at least one cement is at least one selected from the group consisting of Portland cement of the type CEM I, CEM II, CEM III, CEM IV, or CEM V according to standard EN 197-1, calcium aluminate cement according to standard EN 14647: 2006-01, calcium sulfoaluminate cement, puzzolane, and latent hydraulic binder.

9. The method according to claim 1, wherein the one or more luminescent compounds further includes a third luminescent compound having a third average particle diameter smaller than the second average particle diameter.

10. The method according to claim 9, wherein the first average particle diameter is greater than 1 mm, the second average particle diameter is in a range of 0.1 μm to 1 mm, and the third average particle diameter is less than 0.1 μm.

11. A method according to claim 9, wherein a ratio of an amount of the first luminescent compound to a total of an amount of the second luminescent compound and the third luminescent compound in the dry cementitious composition is in a range of 1:2 to 2:1.

12. A method of printing a luminescent 3-dimensional object, the method comprising the steps of:

mixing a dry cementitious composition comprising, relative to a total dry weight of the composition:

15 to 40 wt % of cement;

3 to 7 wt % of at least one of calcium aluminate cement and calcium sulfoaluminate cement;

0 to 35 wt % of at least one of slag and calcined clay;

4 to 12 wt % of one or more luminescent compounds;

5 to 60 wt % of at least one of aggregates and fillers; and 1 to 2 wt % of further additives including calcium carbonate;

controlling a ratio of a total amount of the one or more luminescent compounds to an amount of the calcium carbonate in the mixture to be in a range of 0.41 to 0.81;

conveying the mixture to a print head;

applying the conveyed mixture from the print head to form a luminescent 3-dimensional object; and curing the luminescent 3-dimensional object, wherein the one or more luminescent compounds includes a first luminescent compound having a first average particle diameter, and a second luminescent compound having a second average particle diameter smaller than the first average particle diameter, wherein the first average particle diameter is greater than 1 mm, and the second average particle diameter is 1 mm or less, and wherein a ratio of an amount of the first luminescent compound to an amount of the second luminescent compound in the dry cementitious composition is in a range of 1:3 to 3:1.

* * * * *